United States Patent
Fabry et al.

(10) Patent No.: US 6,288,003 B1
(45) Date of Patent: Sep. 11, 2001

(54) PROCESSES FOR PRODUCING A BLEACHING CLAY PRODUCT

(75) Inventors: Christian P. Fabry, Tallahassee, FL (US); Franz K. Kleindl, Thomasville, GA (US)

(73) Assignee: Gimborn, Inc., Atlanta, GA (US)

( * ) Notice: Subject to any disclaimer, the term of this patent is extended or adjusted under 35 U.S.C. 154(b) by 0 days.

(21) Appl. No.: 09/337,170

(22) Filed: Jun. 21, 1999

(51) Int. Cl.$^7$ ...................................................... B01J 21/16
(52) U.S. Cl. .................................. 502/81; 502/80; 502/85
(58) Field of Search ................................. 502/80, 81, 83, 502/84, 85; 426/253; 554/191

(56) References Cited

U.S. PATENT DOCUMENTS

| | | |
|---|---|---|
| 1,455,995 | 5/1923 | Cramer . |
| 1,492,184 | 4/1924 | Weir et al. . |
| 1,544,210 | 6/1925 | Bierce . |
| 1,716,828 | 6/1929 | Merrill et al. . |
| 1,752,721 | 4/1930 | Bierce . |
| 1,781,265 | 11/1930 | Baylis . |
| 1,792,625 | 2/1931 | Baylis . |
| 1,796,799 | 3/1931 | Manley et al. . |
| 1,844,476 | 2/1932 | Morrell . |
| 1,946,124 | 2/1934 | Belden et al. . |
| 1,949,673 | 3/1934 | Baylis . |
| 2,018,987 | 10/1935 | Wirzmuller . |
| 2,477,386 | 7/1949 | McCarter . |
| 2,602,807 | 7/1952 | Morris et al. . |
| 2,671,058 | 3/1954 | Mickelson . |
| 2,981,697 | 4/1961 | Mickelson et al. . |
| 3,029,783 | 4/1962 | Sawyer et al. . |
| 3,174,826 | * 3/1965 | Allegrini et al. . |
| 3,617,215 | 11/1971 | Sugahara et al. . |
| 4,847,266 | 7/1989 | Hansen et al. . |
| 5,008,226 | 4/1991 | Taylor et al. . |
| 5,330,946 | 7/1994 | Hynes et al. . |
| 5,468,701 | 11/1995 | Nebergall et al. . |
| 5,783,511 | * 7/1998 | Banin et al. . |
| 6,114,267 | * 9/2000 | Ghosh et al. . |

* cited by examiner

*Primary Examiner*—Steven P. Griffin
*Assistant Examiner*—Christina Ildebrando
(74) *Attorney, Agent, or Firm*—Scott R. Cox

(57) ABSTRACT

A process for the production of a bleaching clay product which includes the steps of selecting a naturally occurring hormite clay product, cleaning and crushing the clay product to form clay clumps less than 2 in. in diameter, aging the crushed hormite clay and activating the clay with extremely small amounts of acid, in the range of less than 1 percent, by weight. The process may also be conducted without an aging step. Also, an acceptable bleaching clay product can be produced without the addition of any acid to the aged hormite clay.

14 Claims, 5 Drawing Sheets

| Conditions and Analysis | BLEACHING ACTIVITY | | | | Analysis of clay samples prior to bleaching | | | | |
|---|---|---|---|---|---|---|---|---|---|
| | Color Cell 5 1/4" | | Chlorophyll "A" ppm | Trans % | Residue +63 μ % | H2O % | pH | Acidity H2SO4 % | Filtration sec |
| | Red | Yellow | | | | | | | |
| Base Oil | 10.0 | 70.0 | 1.084 | ......... | | | | | |
| Soybean Oil | | | | | | | | | |
| 0.0% H2SO4 Example 1 | 7.0 | 70.0 | 0.396 | 2.9 | 3.1 | 12.5 | 3.69 | 0.182 | 58 |
| 0.2% H2SO4 Example 2 | 6.2 | 70.0 | 0.345 | 7.6 | 2.9 | 12.1 | 3.45 | 0.245 | 50 |
| 0.4% H2SO4 Example 3 | 5.2 | 70.0 | 0.266 | 16.6 | 4.2 | 13.1 | 2.98 | 0.294 | 42 |
| 0.6% H2SO4 Example 4 | 5.8 | 70.0 | 0.297 | 10.8 | 3.3 | 11.6 | 2.86 | 0.362 | 41 |
| 0.8% H2SO4 Example 5 | 6.0 | 70.0 | 0.295 | 9.8 | 4.0 | 12.7 | 2.73 | 0.398 | 40 |
| 1.0% H2SO4 Example 6 | 5.5 | 70.0 | 0.277 | 12.2 | 3.8 | 12.6 | 2.67 | 0.491 | 40 |
| 1.2% H2SO4 Example 7 | 6.1 | 70.0 | 0.284 | 6.7 | 3.5 | 12.9 | 2.47 | 0.762 | 36 |
| 1.4% H2SO4 Example 8 | 6.2 | 70.0 | 0.289 | 6.7 | 4.7 | 11.9 | 2.43 | 0.858 | 38 |
| Comparative Examples | | | | | | | | | |
| TONSIL 350FF Example 9 | 7.1 | 70.0 | 0.368 | 2.2 | 5.0 | 13.3 | 2.50 | 0.427 | 44 |
| TONSIL 350FF Example 10 | 7.0 | 70.0 | 0.439 | 2.4 | 4.4 | 12.8 | 4.20 | 0.040 | 57 |

Fig. 1

PROCESSES FOR PRODUCING A BLEACHING CLAY PRODUCT

CROSS-REFERENCE TO RELATED APPLICATIONS

None.

1. Background of the Inventions

This invention relates to a process for production of a bleaching clay product from naturally acidic hormite clay by adding extremely small quantities of acid to the mined and crushed hormite clay. In addition, this invention relates to a process for the production of a bleaching clay product by aging the crushed, naturally acidic hormite clay for an extended period of time, and more particularly, by adding extremely small quantities of acid to the aged hormite clay product. In addition, the invention relates to products produced by these processes.

2. Description of Related Art

It is well known that many naturally occurring clays may be used to decolorize oils. These clays decolorize or bleach various oils, such as mineral oils and vegetable oils; various fractions from petroleum, especially lubricating oils, and can be used for refining used lubricating oils, as well as purifying animal fats and beeswax.

In the early 1900's, it was discovered that the bleaching power of naturally-occurring clays could be enhanced by treating those clays with relatively large quantities of a mineral acid, such as hydrochloric or sulphuric acid, and then washing the acid treated clay free of dissolved salts and residual acid created by the acid treatment. This process is conventionally called acid activation. The general process of acid activation of a clay product includes grinding the clay to a generally uniform size, dispersing the clay in water, slurrying the ground clay, and then adding the acid to the clay slurry to form substantially uniform, acid-activated bleaching clay products. This process is disclosed, for example, U.S. Pat. Nos. 1,492,184; 1,781,265; 2,018,987; and 2,671,058.

While many processes are useful for acid activation of various types of clay products, the oils being treated with the acid-activated clay can be damaged by the acid utilized with these processes. Because of this adverse effect, it is conventional practice to wash the clay after acid activation to remove any excess acid. However, that washing creates a waste stream that can contain minerals and acids that are harmful to the environment, and which must be neutralized or otherwise disposed of in an environmentally reasonable manner.

U.S. Pat. No. 5,008,226 has addressed this issue by limiting the amount of acid that is utilized for activation. Thus, after acid activation, it is claimed that this bleaching clay product need not be washed. This patent teaches the addition of from 1 to 10 percent by weight of concentrated sulfuric acid to certain naturally-occurring mixtures of palygorskite and bentonite clays. The preferred range of acid addition is between 3 and 5 percent. Even though the level of acid used in the activation of this clay is low in this process, the acid is still expensive and the bleaching clay product produced can still not be used for the bleaching of certain types of edible oils because of the presence of the acid.

A process for producing an acid-activated, decolorizing clay using a naturally occurring, acidic attapulgite clay with a pH in the range of 5 to 7 and a pore volume in the range of 0.25 to 0.50 cm$^3$/g is known from U.S. Pat. No. 5,008,226. This clay is activated by the addition at a temperature of 25 to 100° C. (77 to 220° F.) of an acidic solution equivalent to 10 percent to 30 percent of the clay by weight. This acid-activated clay is not washed, but is used directly as a decolorizing clay.

Aside from attapulgite clay, bentonite clays can also be activated with acid, but higher concentrations of acid are recommended than for attapulgite clay. Because of the relatively large amounts of acid used during this acid activation, release of acid by the decolorizing clay to the material being decolorized cannot always be avoided.

A process for acid treatment of an attapulgite clay to produce an improved cat litter is known from U.S. Pat. No. 3,029,783. Relatively low percentages of acid are used in this process, and the acid-treated material is not washed. The material is calcined at 370 to 540° C. (700 to 1000° F.) before the acid treatment, with another calcination at about 400 to 590° C. (750 to 1100° F.) occurring after the acid treatment. These treatments are necessary to increase the ability of the attapulgite to absorb urine and other body fluids. Use as a decolorizing clay is not discussed.

U.S. Pat. No. 1,492,184 describes a process for the activation of crude clay with acid, wherein the acid constitutes not more than 10 percent by weight of the clay. Calcining is expressly avoided to prevent evaporation of the acid.

A process for acid activating a clay is also disclosed by U.S. Pat. No. 4,847,226. In this process, the clay is extruded and ground, and an aqueous acidic solution is added to produce a suspension. The suspension is heated, and the acid-treated clay is separated, washed, filtered and dried. There is no heat treatment of the acid-activated clay. The intent of this treatment is to improve the ability of the clay to filter impurities from liquids. In particular, oil-soluble dyes are said to be removed from oils using this product.

Numerous patents have disclosed acid treatment of various types of absorbent clays. In these patents, the amount of acid that is utilized varies considerably, based on the type of clay utilized and whether the clay is washed after the acid activation step. However, in most circumstances the amount of concentrated acid added exceeds ten percent (10%) by weight. These patents include: U.S. Pat. Nos. 1,844,476; 1,792,625; 1,796,799; 3,617,215; 1,752,721; 1,716,828; 1,455,995; 1,949,673; 2,602,807; 1,544,210; 2,981,697; 1,946,124; and 2,484,828.

Processes for the regeneration of spent acid-activated bentonite clay are disclosed in U.S. Pat. Nos. 5,468,701 and 5,330,946. See also U.S. Pat. Nos. 2,477,386 and 2,671,058.

It has now been discovered that even the relatively low percentages of acid taught by some of the prior art patents may have an adverse effect on the bleaching clay product and/or on the oil being bleached by the bleaching clay product.

Accordingly, it is an object of this invention to disclose a process for the production of a bleaching clay product, whereby extremely small amounts of acid are added to the preliminary clay products.

It is a still further object of this invention to disclose a process for the production of a bleaching clay product which can be effective for the bleaching of certain types of oil, even with no acid activation.

It is a still further object of this invention to disclose a process for the production of a bleaching clay product which can be activated by merely aging the clay product in situ without adding any acid to the clay product.

It is a still further object of the invention to disclose bleaching clay products produced by the process of adding acid at levels less than 1 percent by weight to a crushed hormite clay.

These and further aspects of the invention will be apparent from the foregoing description of the preferred embodiment of the process and the product produced by that process.

BRIEF DESCRIPTION OF THE INVENTION

One preferred process for the production of a bleaching clay product of this invention comprises selecting a naturally occurring, raw hormite clay product, cleaning the raw hormite clay product, crushing the cleaned, hormite clay product to produce hormite clay clumps, wherein at least about eighty percent (80%) by weight of the clumps are less than about 2 ins. in diameter, aging the hormite clay clumps for at least about 6 months in situ, drying the aged hormite clay clumps, and milling the dried hormite clay to form a bleaching clay product with a residual acidity of less than about 0.25 percent by weight, preferably less than 0.2 percent by weight and most preferably less than 0.15 percent by weight.

An additional preferred process for the production of a bleaching clay product comprises selecting a naturally occurring, raw hormite clay product, cleaning the raw hormite clay product, crushing the cleaned hormite clay product to produce hormite clay clumps, wherein at least about eighty percent (80%) by weight of the clumps are less than about 2 ins. in diameter, and treating the hormite clay clumps with less than 1 percent by weight, based on the dry weight of the clay product, of a concentrated acid. Preferably the amount of acid added is less than 0.5 percent, and most preferably from about 0.3 to about 0.5 percent. The acid treated hormite clay clumps are then dried and milled to form a bleaching clay product with a residual acidity of less than about 1 percent by weight, preferably less than 0.5 percent by weight. No washing of the bleaching clay product is necessary.

An additional preferred process for the production of a bleaching clay product comprises selecting a naturally occurring, raw hormite clay product, cleaning the raw hormite clay product, crushing the cleaned, hormite clay product to produce hormite clay clumps, wherein at least about eighty percent (80%) by weight, of the clumps are less than about 2 ins. in diameter, aging the hormite clay clumps for a period of at least about 6 months, and treating the hormite clay clumps with less than 1 percent by weight, based on the dry weight of the clay product, of a concentrated acid. Preferably the amount of acid added is less than 0.5 percent by weight, and most preferably from y about 0.3 to about 0.5 percent, by weight. The acid treated hormite clay clumps are then dried and milled to form a bleaching clay product with a natural acidity of less than about 0.5 percent by weight.

In addition, the invention includes products produced by these processes for the production of bleaching clay products.

BRIEF DESCRIPTION OF THE DRAWING

FIG. 1 provides a summary of the performance of the products of Examples 1 through 8 and Comparative Examples 9 and 10.

DETAILED DESCRIPTION OF THE PREFERRED EMBODIMENT

Figure 3:
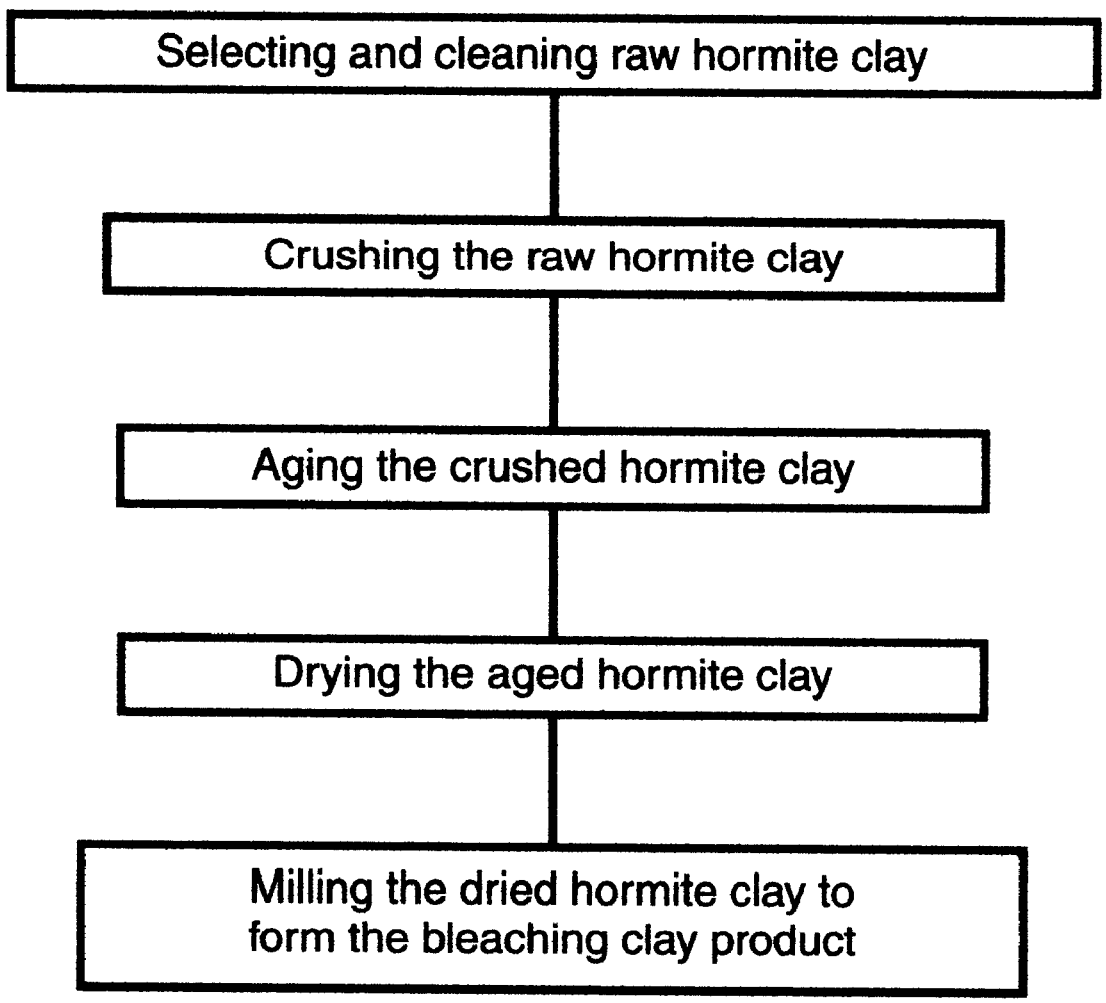
FIG. 3 is a flow chart of a preferred method for production of a bleaching clay product.

The invention is a series of processes for the production of bleaching clay products. In one preferred embodiment, the process preferably comprises the steps of:

selecting a naturally occurring, raw, hormite clay product;

cleaning the raw hormite clay product;

crushing the cleaned, hormite clay product to a generally uniform size to produce hormite clay clumps;

aging the hormite clay clumps in situ for a period of at least about six (6) months;

drying the aged hormite clay clumps; and milling the dried hormite clay clumps to form a bleaching clay product with a natural acidity of less than about 0.25 percent, by weight. A schematic of this process is shown in FIG. 3.

Figure 4:
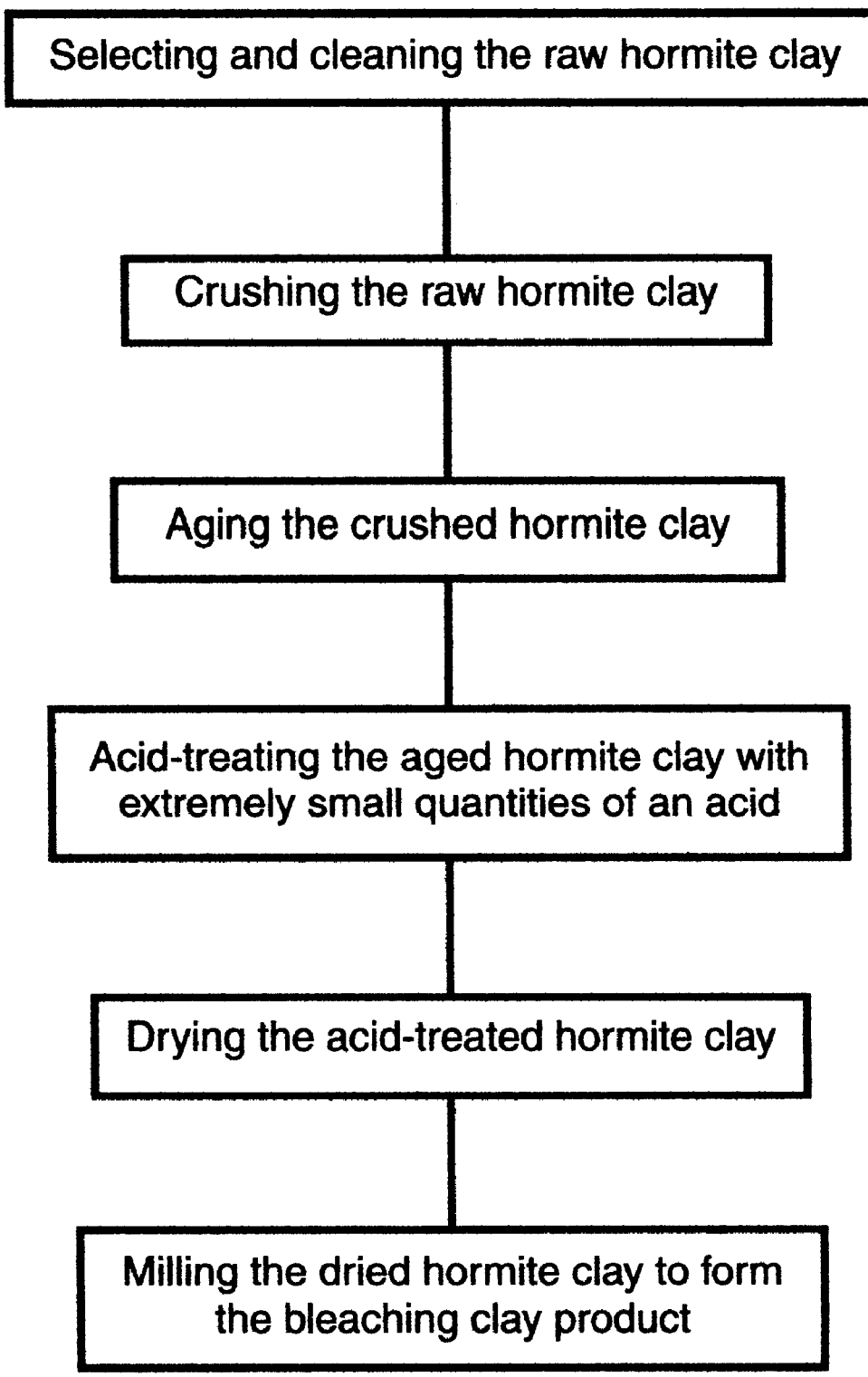
FIG. 4 is a flow chart of an alternative preferred method for production of a bleaching clay product.
Figure 5:
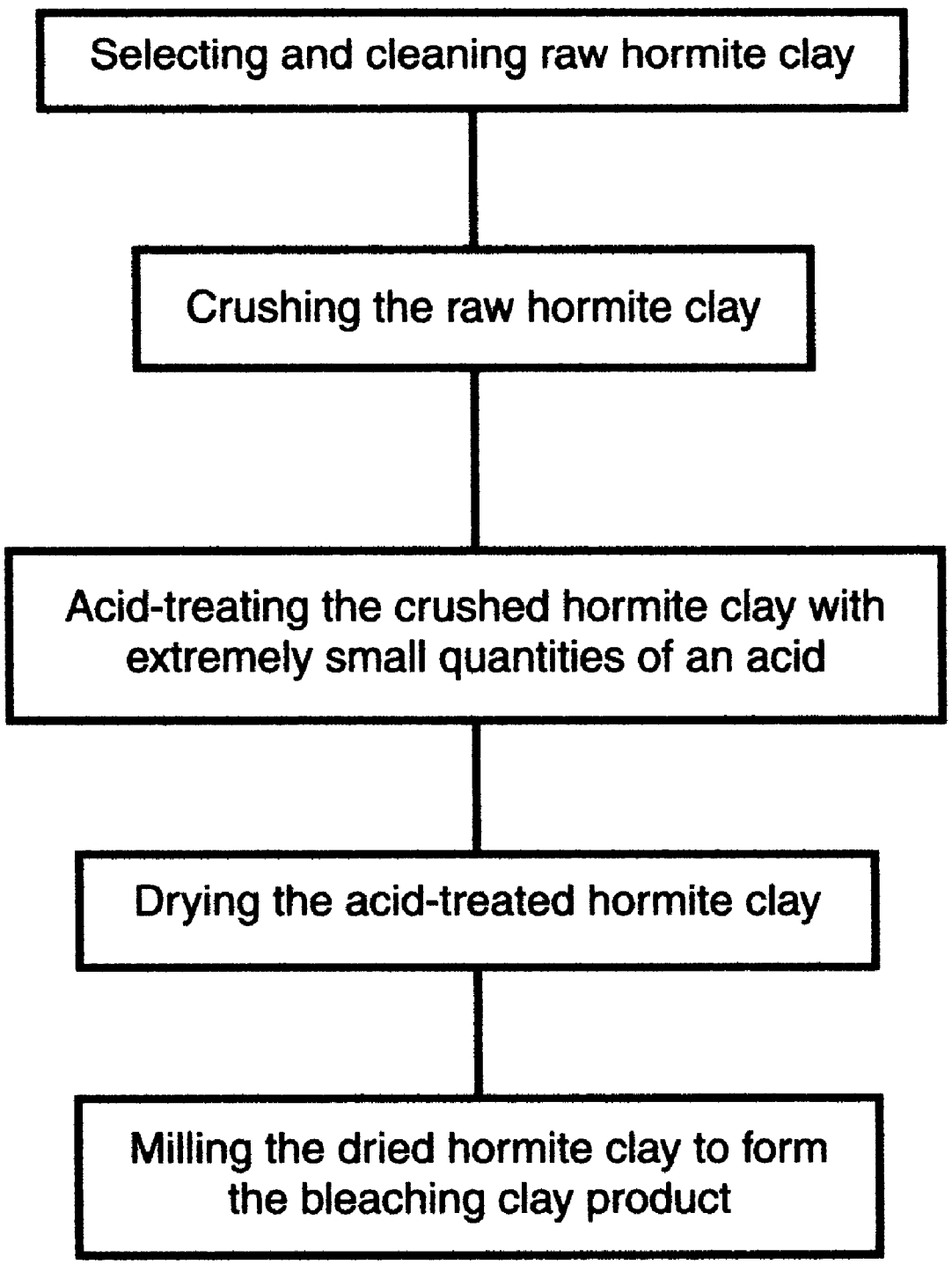
FIG. 5 is a flow chart of a second, alternative preferred method for production of a bleaching clay product.

Preferably, extremely small quantities of an acid are also added to the hormite clay product during its processing to enhance its bleaching capability for various oil products as shown in schematic FIGS. 4 and 5.

The starting product for the bleaching clay product is a raw clay, which is preferably primarily a hormite clay. Hormite clays contain major proportions of palygorskite and sepiolite. The hormite clay is preferably mined from the Meigs-Attapulgus-Quincy area of Georgia and Florida, particularly around Meigs, Ga. Conventionally, the term "hormite" has been applied to a wide range of clay materials that have been used as absorbents. For purposes of the present invention, the preferred hormite clay is a clay mined from the region around Meigs, Ga., although other similarly described clay products, which also contain high concentrations of hormite clay, are also included in the present invention.

The composition of this raw hormite clay is primarily palygorskite (or attapulgite) clay. See C. Harvey and H. Murray, "Industrial Clays in the 21st Century: A Perspective of Exploration, Technology and Utilization", *Applied Clay Science* 11, pp. 285–310, particularly pp. 302–306 (1997). In addition, this raw hormite clay frequently contains small quantities (10 percent or less) of other materials, such as kaolinite, quartz, feldspar and mica. In a preferred embodiment, the raw, hormite clay is composed of at least about 40 to 50 percent, by weight, palygorskite (or attapulgite) and sepiolite and at least about 30 to 40 percent, by weight, calcium montmorillonite. The content of the additional components of this raw, hormite product, such as kaolinite, quartz, feldspar and mica, should not be greater than about ten (10) percent.

The raw, hormite clay has a pH of about 6.5, preferably about 6.0 or so.

The raw, hormite clay is mined by conventional mining procedures, and has a water content after mining of less than about 60 percent, preferably from about 45 to 55 percent.

After the raw, hormite clay is mined, it is cleaned. The raw, hormite clay, is cleaned to remove large rocks and other such gross impurities. In the conventional clay mining process, the overburden is first removed from the natural, hormite clay bed before the raw, hormite clay is mined. Care is taken to separate the raw, hormite clay from the other materials that can be present with the raw, hormite clay, such as rocks, mud, and sand.

After mining, the raw, hormite clay is sent through a conventional shredder or crusher, such as a Gleason shredder, which crushes the raw, hormite clay into clumps with a size of about 2 to 3 in. or less. Preferably at least about eighty percent (80%) of the raw, hormite clay is present in clumps which are 2 in. or less in size.

Useful bleaching clay products can be produced from this crushed hormite clay without aging. Thus, in one preferred embodiment as shown in schematic FIG. 5, the aging step, which is discussed in the following paragraphs, is not utilized. However, in more preferred embodiments as shown in schematic FIGS. 3 and 4, the hormite clay clumps are aged uncovered in situ for an extended period of time. The clumps are preferably placed into large piles and allowed to age naturally in the open air. Preferably, the raw, hormite clay clumps are aged for at least about six (6) months, and more preferably at least about 12 months or more. This aging process results in the hormite clay becoming more acidic, generally dropping its pH from a level of about 6.5, preferably to a level less than 6.5 and more preferably to a level of 5.5 or less, depending on the period of time the hormite clay clumps are aged.

After aging, the hormite clay clumps are preferably crushed again in a secondary crusher, such as a jaw-toothed crusher, and optionally a tertiary crusher, such as a roll crusher, to break apart any raw, hormite clay clumps that may have formed during the aging process. After the crushing of the aged, raw hormite clay clumps, the clay product is then preferably passed through a kneading process, preferably through a conventional pugmill. It is during this kneading process that the acid, if any, is preferably added to the hormite clay.

While in one preferred embodiment as shown in schematic FIG. 3, useful bleaching clay products can be produced without adding any acid, more preferred embodiments are shown in schematic FIGS. 4 and 5. In these embodiments, extremely small quantities of acid are added to the hormite clay to enhance its bleaching activity. The acid activation is preferably carried out during the pugmilling of the hormite clay, although the acid can be added at any convenient stage in the processing of the clay. After the acid has been added, the hormite clay product and the acid are kneaded together in the pugmill to activate the hormite clay. This procedure forms a homogenous mixture of the activating acid and the clay product with an overall moisture content of about 55 percent, preferably about 50 percent. After mixing of the acid-activated hormite clay in the pugmill, it is preferably extruded through a conventional extruder to form extrudates of any conventional size, preferably from about 0.5 inch to about 6.0 inches in length and about 0.2 inch to about 0.8 inch in diameter.

The extruded hormite clay is then dried conventionally by rotary driers or fluid bed driers to reduce its moisture content to about 20 to 30 percent, preferably from about 20 to about 25 percent.

The dried hormite clay is then milled to the appropriate size for use as a bleaching clay product. The milling process is conventional, for example, utilizing a roller mill. The hormite clay products are preferably milled so that at least about 95 percent of the resulting products are less than about 100 micron (160 mesh) in size and more preferably 98 percent are less than about 100 micron (160 mesh) in size. The residual acidity of the bleaching clay product is less than about 1 percent, more preferably less than about 0.5 percent.

The preferred moisture content of the milled product is from about 10 to about 20 percent, by weight.

It has been surprisingly discovered that the addition of even extremely small quantities of acid to the preliminary hormite clay ultimately produces bleaching clay products with exceptional bleaching properties. In addition, by limiting the quantity of the acid used to extremely small percentages, there is a reduced likelihood of damage to the oil product which is bleached by the bleaching clay product, and virtually no opportunity for acid runoff during the manufacturing process for producing the bleaching clay product.

Preferably the amount of acid added is 1 percent or less by weight, based on the dry weight of the hormite clay being activated, of a concentrated mineral acid. It has been surprisingly discovered that the use of higher percentages of acid does not enhance the bleaching activity of the clay product, and in fact, often reduces the bleaching activity of the bleaching clay product, especially for some oil products. Therefore, no more than about 1 percent of the concentrated acid should be added to the hormite clay product, preferably less than 0.5 percent and most preferably from about 0.3 to about 0.5 percent, by weight.

The acid is preferably added in concentrated form with an acid concentration of about 95 to 97 percent, or so. The acid activation is preferably done with a mineral acid, such as sulfuric acid, hydrochloric acid, nitric acid or phosphoric acid. Sulfuric acid is preferred, as it does not evaporate during either the acid activation step or the beginning of the final drying step. This permits a more complete activation of the hormite clay. Phosphoric acid has a similar action, as poorly soluble aluminum phosphate is formed. However, it does not migrate into the pores as easily. This disadvantage can be eliminated by using a mixture of sulfuric acid and phosphoric acid.

Hydrochloric acid is less desirable as an activating acid, as it evaporates during activation and forms soluble salts, which can be washed out of the micropores of the clay product. Hydrochloric acid can be used, though, if the activation is done at elevated pressures. These disadvantages can also be eliminated by using a mixture of sulfuric acid and hydrochloric acid. After the acid is added to the hormite clay product, the hormite clay is mixed and kneaded, as discussed above. Because of the use of extremely small percentages of acid that are added to the hormite clay product, no washing of the hormite clay product is necessary to remove excess acid.

Activation can be done at room temperature or at slightly elevated temperatures. Processing at elevated temperatures allows the acid to migrate into the micropores of the hormite clay and be deposited therein.

After the hormite clay has been milled, it is processed conventionally. For example, the milled, hormite clay products are preferably treated to remove "fines". The fines may be reintroduced to the processing of the hormite clay during any convenient processing step, preferably during the kneading step. The milled clay product is then packaged for shipment, either in bags, or in bulk containers for large shipments of the product.

It has also been surprisingly discovered that a high quality, hormite bleaching clay product can be produced even if the aging step is eliminated from the above-referenced process as shown in schematic FIG. 5. In this alternative preferred process, the naturally occurring raw hormite clay product is mined, cleaned and crushed, as discussed above, to produce clumps wherein at least about eighty percent (80%) of the clumps are crushed to a size less than about 2 in. in diameter. Instead of aging the crushed hormite clay, however, it is immediately activated with an acid, dried to a moisture content of from about 20 to about 30 percent and milled to a size useful as a bleaching clay product, as discussed above. While the hormite clay product produced by this process without aging has a higher pH than the hormite clay product discussed above that is treated with an acid, and may also have slightly less bleaching activity than its aged counterpart, it is still useful for the removal of colored impurities from certain types of oils. Further, this acid-activated, non-aged hormite bleaching clay is quite useful as a bleaching clay product, even when the amount of acid added to the clay product is 1 percent or less, preferably from about 0.5 to about 1 percent.

The products produced by these processes are particularly useful for the decolorizing of food, fats and oils, such as olive oil, linseed oil, soybean oil, canola oil, cottonseed oil, tallow oil, sunflower oil, coconut oil, palm oil, and grapeseed oil, as well as waste petroleum oils. The products according to the invention absorb colored impurities such as chlorophyll, carotinoids, or xanthophyll. Phospholipids in the fats and oils are also absorbed.

EXAMPLES

The invention is explained by the following examples.

Examples 1–8 and Comparative Examples 9 and 10

Figure 2:
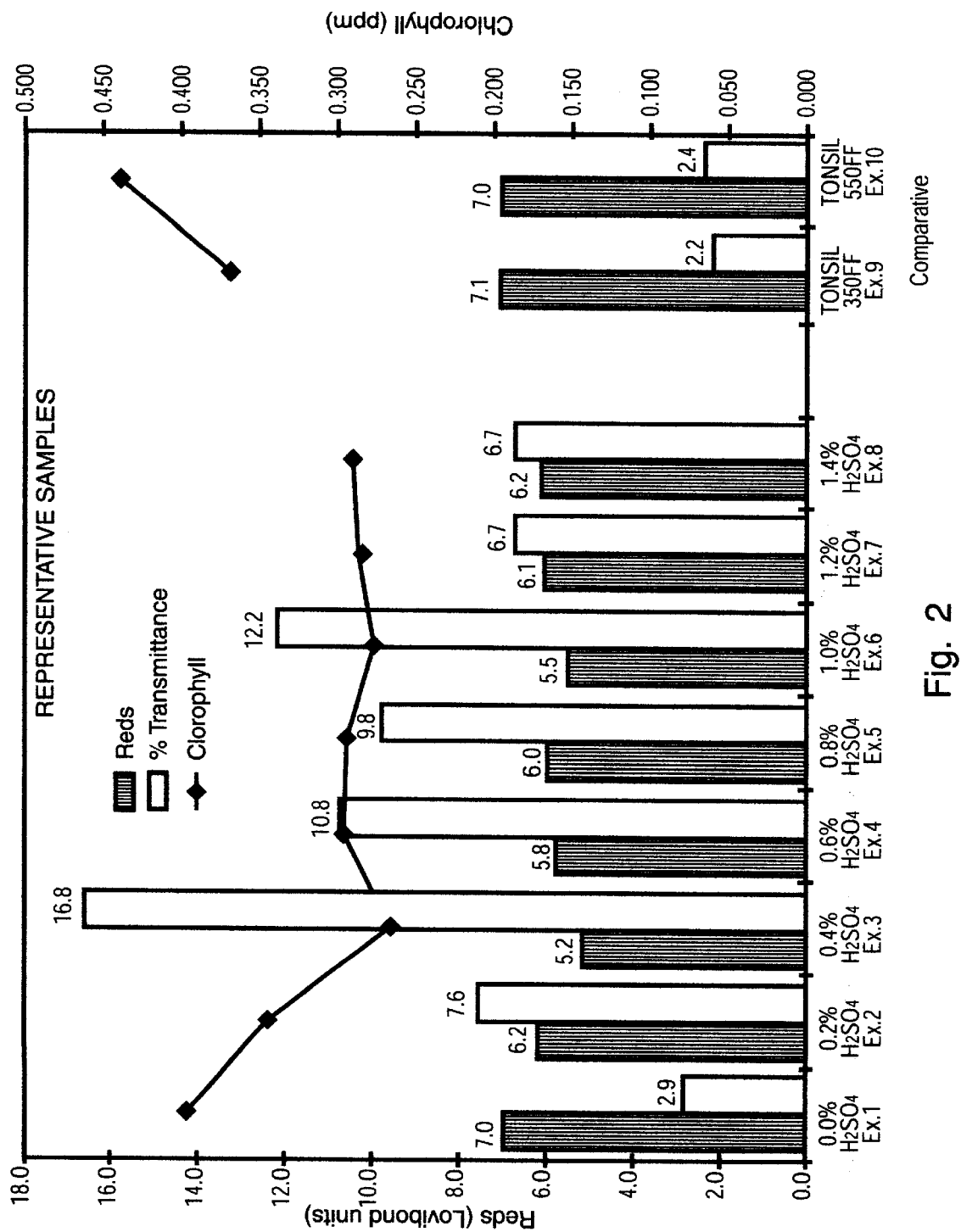
FIG. 2 provides a summary of the absorption of various impurities by Examples 1 through 8 and Comparative Examples 9 and 10.

A natural occurring hormite clay from Meigs, Ga., was mined. The clay was cleaned by bulldozer/excavator, and then crushed to form hormite clay clumps with a size less than about 2 in. in diameter. The hormite clay clumps were then aged for 6 to 18 months. The hormite clay clumps were then crushed a second time to a size of less than about 2 in. At this point, the crushed hormite clay was treated with varying percentages by weight of concentrated sulfuric acid, ranging at intervals of 0.2 percent, by weight, from no addition of acid to 1.4 percent of sulfuric acid. The results of treatment with various levels of acid are shown on FIGS. 1 and 2 for Examples 1 through 8 and Comparative Examples 9 and 10. The acid was added as the crushed, raw clay was passed through a conventional pugmill. The acid was added by spray nozzles which were located in the top section of the pugmill. A flow meter was used to add the right amount of acid, which was stored in a tank adjacent to the pugmill. Once the raw, hormite clay entered the pugmill, the acid was sprayed onto the clay. The clay/acid mixture was then kneaded as it passed through the pugmill. Upon exiting the pugmill, it passed through a bedeshi extruder, where the acid and the hormite clay were intimately mixed and sheared. The hormite clay extrudates then exited the extruder where they were transported to the drier. The extrudate was about 3–6 inches in length and about 0.5 inch in diameter. The treated hormite clay was then dried to a water content of about 20 to about 30 percent conventionally by use of a rotary drum or a fluid bed drier. The extruded hormite clay was then milled to an appropriate size for use as a bleaching clay product. The milling process was conventional utilizing a roller mill. The milled hormite clay products were milled so that at least 95 percent of the resulting products were less than about 160 mesh (100 micron) in size.

The hormite clay products were then tested for absorption of red and yellow colors and chlorophyll using a Lovibond Tintometer PFX990 using conventional testing procedures. A Color-Scale, which is called a "Lovibond colors R, X, B and H" is used to measure the content of reds, yellows, blues and neutral colors. The results of these tests are shown non FIGS. 1 and 2.

FIG. 1 can be interpreted as follows: The base oil, soybean oil, which is not bleached, had a preliminary red value of 10, a yellow value of 70 and contains 1.084 ppm chlorophyll. After treating the base oil with the bleaching clays, these values dropped to less than one ppm. As a result the oil was clearer. The lower the number for reds, yellows and chlorophyll, the better the oil and the better the bleaching clay which was utilized. The value for transmittance (Trans %) was obtained by comparing the bleached oil sample against a standard which was water. (Water has a transmittance of 100%.) The higher the number in the column for transmittance, the clearer the oil. The values for residue and $H_2O$ are not that important, and depend solely on the drying and milling. pH values dropped as more acid was added. At the same time the value for acidity went up. There is a limit on the amount of acid that should be used because a high residual acidity may be created which creates free fatty acids in the oil being treated, whose presence are undesirable. The filtration rate in the last column of FIG. 1 is a function of particle size distribution. Generally speaking, the filtration time will be low (or fast) when the bleaching clay particles are coarse and the oil can pass through the clay quickly. On the other hand, filtration times are high (or slow) when the bleaching clay particles are fine thus impeding the flow of oil.

For comparison, Tonsil 350FF and Tonsil 550FF, manufactured by Waverly Mineral Products Co. were utilized in Comparative Examples 9 and 10, respectively, and are shown on FIG. 1. The performance of these products are also shown on FIG. 2 wherein the units of "reds," transmittance percentage and ppm of chlorophyll remaining is disclosed.

As is clear from these examples, the performance of the hormite clay-based bleaching clay products produced by the processes of the invention was very good, even when the percentage of acid added was below 1 percent. In fact, the best level of performance was at about 0.4 percent.

The residual acidity in the hormite clay samples was determined using the following procedure:

I. Objective

To provide instructions for determining the percentage of free acid calculated as sulfuric acid in a clay sample.

II. Scope

The scope covers preparing the sample for analysis and analyzing the sample once it is in the lab for acid concentration of a clay sample.

III. Generalities

| 3.1 Lab Equipment and Materials | |
|---|---|
| 3.1.1. | 0.1% bromophenol blue solution |
| 3.1.2. | Erlenmeyer glass beaker, 250 ml |
| 3.1.3. | Graduated burette, 25 ml |
| 3.1.4. | 250 ml beaker |
| 3.1.5. | Weigh paper, 6 × 6 |
| 3.1.6. | Small plastic scoop |
| 3.1.7. | Distilled Water |
| 3.1.8. | NaOH solution, 0.1 N |
| 3.1.9. | 1% Phenolphthalein |
| 3.1.10. | Hot plate |
| 3.1.11. | pH meter - with 4 & 7 buffer and wipes |
| 3.1.12. | 250 ml graduated cylinder |
| 3.1.13. | 100 ml graduated cylinder |
| 3.1.14. | 185 mm fluted filter paper |
| 3.1.15. | 100 ml beaker |
| 3.1.16. | Analytical balance - precision 0.01 g |
| 3.1.17. | 10 ml pipette |

IV. Procedures

| 4.1 Residual Acidity of a clay sample | |
|---|---|
| 4.1.1. | Weigh 20 g of sample, previously milled to less than 2.0 mm on a tarred piece of weigh paper using the analytical balance. Weigh to an accuracy of 0.001 g. Pour the sample into a 250 ml Erlenmeyer flask containing 200 ml distilled water. |
| 4.1.2. | Heat this mixture to boiling on the hot plate. It takes approximately 20 minutes on the hot plate. |
| 4.1.3. | Pour the heated mixture into the fluted filter paper to remove the solid material. The fluted filter paper is placed in a small plastic funnel that is placed into the 100 ml graduated cylinder. |
| 4.1.4. | Take 100 ml of the filtrate and transfer it to a 250 ml erlenmeyer flask. To this flask with filtrate add 4–6 drops of a 1% solution of phenolphthalein/ethanol indicator. |
| 4.1.5. | Titrate with a volumetric solution of sodium hydroxide (0.1 N) until the solution changes from a clear to a pink color. Record the volume of titrant used. |

4.2 Calculations 4.2.1 To calculate the residual acidity in percent, use the following formula:

$$\text{Residual Acidity of \%} = \frac{\text{ml NaOH} \times \text{N} \times 0.04904}{\text{g of sample}} \times 100$$

While the invention has been described in terms of the various preferred embodiments, these should not be construed as limitations on the scope of the invention. Many other variations, modifications, substitutions and changes may be made without departing from the scope of the invention.

We claim:

1. A process for producing a bleaching clay product comprising
   selecting and cleaning a naturally occurring, raw hormite clay product;
   crushing the cleaned, hormite clay product to produce hormite clay clumps;
   aging the hormite clay clumps for a period of at least 6 months;
   drying the aged hormite clay; and
   milling the dried, hormite clay to form the bleaching clay product, wherein the bleaching clay product has a pH of less than 6.5.

2. The process of claim 1 wherein at least 80 percent of the hormite clay clumps by weight are less than about 2 inches in diameter.

3. The process of claim 1 wherein the dried hormite clay has a water content of from about 20 to 30 percent.

4. The process of claim 1 wherein the bleaching clay product has a residual acidity of less than 1 percent, by weight.

5. The process of claim 1 wherein the hormite clay comprises palygorskite and sepiolite.

6. The process of claim 1 wherein the crushed hormite clay clumps are aged for a period of at least 12 months.

7. A process for producing a bleaching clay comprising
   selecting and cleaning a naturally occurring raw hormite clay product;
   crushing the cleaned hormite clay product to produce hormite clay clumps;
   aging the crushed hormite clay clumps for a period of at least 6 months;
   treating the aged bleaching clay product with an acid comprising less than 1 percent by weight of a concentrated acid, based on the dried weight of the hormite clay;
   drying the acid treated hormite clay clumps, wherein the dried hormite clay has a pH of less than 5.5; and
   milling the dried hormite clay to form the bleaching clay product.

8. The process of claim 7 wherein the amount of the concentrated acid added is less than 0.5 percent, based on the dry weight of the clay product.

9. The process of claim 7 wherein the amount of the concentrated acid added is from about 0.3 to about 0.5 percent by weight, based on the dry weight of the clay product.

10. The process of claim 7 wherein at least 80 percent of the clay clumps by weight are less than 2 inches in diameter.

11. The process of claim 7 wherein the bleaching clay product has a residual acidity of less than 1 percent by weight.

12. The process of claim 7 wherein the dried hormite clay has a water content of from about 20 to 30 percent.

13. The process of claim 7 wherein the hormite clay comprises palygorskite and sepiolite.

14. The process of claim 7 wherein the crushed hormite clay clumps are aged for a period of at least 12 months.

\* \* \* \* \*